(12) United States Patent
Berment et al.

(10) Patent No.: US 10,347,137 B2
(45) Date of Patent: Jul. 9, 2019

(54) COMMUNICATION SYSTEM AND METHOD FOR AN AIR CONTROL CENTER

(71) Applicant: CS Systèmes d'Information, Le Plessis Robinson (FR)

(72) Inventors: Vincent Berment, Paris (FR); Bernard Thebault, Cachan (FR)

(73) Assignee: CS Systèmes d'Information, Le Plessis Robinson (FR)

( * ) Notice: Subject to any disclaimer, the term of this patent is extended or adjusted under 35 U.S.C. 154(b) by 125 days.

(21) Appl. No.: 15/526,728

(22) PCT Filed: Nov. 6, 2015

(86) PCT No.: PCT/EP2015/075888
§ 371 (c)(1),
(2) Date: May 12, 2017

(87) PCT Pub. No.: WO2016/078931
PCT Pub. Date: May 26, 2016

(65) Prior Publication Data
US 2017/0337823 A1 Nov. 23, 2017

(30) Foreign Application Priority Data
Nov. 17, 2014 (FR) .................................... 14 61041

(51) Int. Cl.
*G08G 5/00* (2006.01)
*H04L 29/06* (2006.01)
(Continued)

(52) U.S. Cl.
CPC ......... *G08G 5/0013* (2013.01); *G08G 5/0021* (2013.01); *G08G 5/0026* (2013.01);
(Continued)

(58) Field of Classification Search
CPC .. G08G 5/0013; G08G 5/0021; G08G 5/0026; H04L 63/0428; H04L 2012/4028; H04W 84/06; H04B 7/18506
See application file for complete search history.

(56) References Cited

U.S. PATENT DOCUMENTS 8,219,799 B1 * 7/2012 Lucchesi ............... H04L 63/105
713/150
8,220,038 B1 * 7/2012 Lucchesi ............... H04L 63/105
726/4
(Continued)

FOREIGN PATENT DOCUMENTS

FR    2989854    10/2013

OTHER PUBLICATIONS

Search Report from FR National Institute of Industrial Property on related FR application (FR1461041) dated Sep. 28, 2015.

*Primary Examiner* — Courtney D Heinle
(74) *Attorney, Agent, or Firm* — Klein, O'Neill & Singh, LLP

(57) ABSTRACT

The invention relates to a communication system for an air control center, comprising a first public communication channel, a second secure communication channel, at least one voice communication device for exchanging voice data on each of the two communication channels, at least one management station comprising a control interface and a display interface and designed to manage the voice data exchanges and to control the branching of the voice data into each of the two communication channels, a first stand-alone processing module and a second stand-alone processing module for generating a display in a secure manner on said display interface.

20 Claims, 3 Drawing Sheets

(51) Int. Cl.
*H04W 84/06* (2009.01)
*H04B 7/185* (2006.01)
*H04L 12/40* (2006.01)

(52) U.S. Cl.
CPC ......... *H04L 63/0428* (2013.01); *H04W 84/06* (2013.01); *H04B 7/18506* (2013.01); *H04L 2012/4028* (2013.01)

(56) References Cited

U.S. PATENT DOCUMENTS

| | | | | |
|---|---|---|---|---|
| 2003/0030581 | A1* | 2/2003 | Roy | H04B 7/18508 342/36 |
| 2004/0162067 | A1* | 8/2004 | Stefani | B64D 45/0015 455/431 |
| 2006/0008087 | A1* | 1/2006 | Olive | G01S 13/782 380/255 |
| 2007/0111725 | A1* | 5/2007 | Kauffman | B64D 45/0015 455/431 |
| 2011/0087879 | A1* | 4/2011 | Chand | H04K 3/25 713/153 |
| 2011/0243329 | A1* | 10/2011 | Staehly | H04K 1/00 380/256 |
| 2015/0212206 | A1* | 7/2015 | Lee | H04L 63/0823 342/30 |
| 2016/0211907 | A1* | 7/2016 | Nelson | H04B 7/18506 |

\* cited by examiner

COMMUNICATION SYSTEM AND METHOD FOR AN AIR CONTROL CENTER

FIELD OF ART

This invention relates to the general field of communication systems, in particular, a communication system for an air traffic control centre for civil and/or military purposes.

In a known manner, an air control centre makes it possible to control aircraft located in an air navigation zone. An operator of an air control centre makes it possible to communicate by voice with each aircraft pilot of said air navigation zone. In practice, the operator can control civil aircraft as well as military aircraft. In order to retain the confidentiality of the communications exchanged between an air control centre and a military aircraft, the communications can be encrypted.

In order to provide air control, each operator of a control centre is provided with a voice communication device, in particular a micro-headset, in order to listen to and speak to the aircraft pilots as well as a management station in order to activate functions, for example, a change in communication frequencies and an encryption of the voice data exchanged. The management station has the conventional form of a tactile device in order to allow simple and ergonomic access for the operator to the functions displayed on the tactile device.

In reference to FIG. 1, the communication system comprises a first public communication channel V1, referred to as "black channel", and second secure communication channel V2, referred to as "red channel". Contrary to the first public communication channel V1, the secure communication channel V2 comprises an encryption module K in order to encrypt the voice data emitted and received.

The first public communication channel V1 comprises a first network switch 6 for exchanging voice data between a plurality of voice communication devices 1 and the exterior EXT, i.e., aircraft of a predetermined navigation zone or of other air control centres.

Still in reference to FIG. 1 the second secure communication channel V2 comprises a second network switch 7 and an encryption module K which are designed to exchange encrypted voice data between the plurality of voice communication devices 1 and the exterior EXT. In particular, the second network switch 7 of the second secure communication channel V2 is connected to the first network switch 6 of the first public communication channel V1 in order to access the exterior EXT.

As such, in order to communicate in an unencrypted manner with an aircraft, the operator uses his micro-headset 1 to emit voice data directly to the first network switch 6 of the first public communication channel V1 in order to access the exterior EXT. On the contrary, in order to control a military aircraft in encrypted mode, the operator uses his micro-headset 1 in order to emit voice data directly to the second network switch 7 of the second secure communication channel V2 so that the voice data is encrypted by the encryption module K before it is sent to the first network switch 6 of the first public communication channel V1 in order to access the exterior EXT.

In practice, in reference to FIG. 1, the communication system comprises a plurality of communication devices of which a portion of the devices is located in a secure zone ZR referred to as "red zone". A black zone ZN is defined wherein the devices are housed which are not located in the red zone ZR. The voice data that circulates through the devices of the black zone ZN is not sensitive. On the contrary, the voice data that circulates through the devices of the red zone ZR is sensitive and must not be compromised. As an example, a red zone ZR generally comprises a room protected by a Faraday cage in order to prevent any possibility of interception.

In order to prevent the compromise of the voice data exchanged between an operator of an air control centre and a military aircraft, it is important to prevent any leakage of voice data from the second secure communication channel V2 to the first public communication channel V1. To this effect, the communication system comprises a security module 5 that connects each voice communication device 1 of an operator, i.e. his micro-headset, to the switches 6, 7 of the first public communication channel V1 and of the second secure communication channel V2. Such a security module 5 makes it possible to ensure that the voice data emitted by the operator is indeed emitted in an encrypted manner such as presented in patent application EP2943813. Advantageously, thanks to the security module 5, the risk of a compromise of the voice data exchanged is limited.

The management station 2 of an operator, i.e. his tactile device, remains connected to the first public communication channel V1 and to the second secure communication channel V2 in order to control their switches 6, 7, in particular, during a change in communication channel. Due to its connection to the two communication channels V1, V2, the management station 2 can have a risk in the case of high-performance spying, in particular, through the analysis of the signals transiting through the electrical power supply of the management station 2.

One of the objectives of this invention is to propose a communication system for air control of which the security is improved in order to remove any potential risk of compromise of the voice data exchanged.

SUMMARY

To this effect, the invention relates to a communication system for an air control centre comprising a first public communication channel, a second secure communication channel, at least one voice communication device for exchanging voice data on each of the two communication channels, and at least one management station, comprising a control interface and a display interface, designed to manage the voice data exchanges and control the branching of the voice data into each of the two communication channels.

The invention is noteworthy in that the management station comprises:

a first stand-alone processing module, belonging to the first public communication channel, designed to, on the one hand, receive a control message from the control interface following a physical control from an operator and, on the other hand, emit a primary message according to the control message received, a second stand-alone processing module, belonging to the second secure communication channel, that is designed to, on the one hand, receive a primary message and, on the other hand, generate a display according to said primary message received on said display interface for the attention of said operator; and means for transferring a primary message from the first stand-alone processing module to the second stand-alone processing module.

Thanks to the invention, the display and the control of the management station are dissociated. As such, no pertinent information can be obtained in case of interception of a control message over the first public communication channel. Given that the display is generated over the second secure communication channel, the risk of compromise is low. Each stand-alone processing module benefits from its own electrical power supply, which eliminates any connection between the first public communication channel and the second private communication channel.

Advantageously, the improvement in the security is transparent for the operator who has a management station with an exterior aspect similar to prior art.

Preferably, the control interface is a touchscreen in order to retain a user interface that is similar to prior art. More preferably, the control interface and the display interface are superimposed.

According to a preferred aspect, the means for transferring are unidirectional in order to prevent any communication from the second private communication channel to the first public communication channel. Preferably, the means for transferring comprise at least one diode.

Preferably, the second stand-alone processing module is located in a secure zone, more preferably, in a room protected by a Faraday cage. As such, any risk of compromise of the display of the management station is eliminated.

According to a preferred aspect, the control interface is connected to the first stand-alone processing module by an optical fibre in order to limit the risk of interception.

Preferably, the first stand-alone processing module comprises means for processing designed to emit a functional control, according to the control message received, to a device of the first public communication channel. As such, the first stand-alone processing module can emit non-secure controls in the manner of a conventional management station.

More preferably, the second stand-alone processing module comprises means for processing designed to emit a functional control, according to the primary message received, to a device of the second secure communication channel. As such, the second stand-alone processing module can emit secure controls in the manner of a conventional management station. The two communication channels are advantageously dissociated in the communication system according to the invention.

Preferably, the first stand-alone processing module and the second stand-alone processing module comprise respectively means for generating a public display and a secure display, the second stand-alone processing module comprises means of synthesis in order to form a display combining the public display and the secure display. The management of displays is as such advantageously shared between the two processing modules in order to allow for monitoring in real time of the display on the viewing screen during a switch between the two communication channels.

The invention also relates to a communication method for an air control centre comprising a first public communication channel, a second secure communication channel, at least one voice communication device for exchanging voice data on each of the two communication channels, and at least one management station designed to manage the voice data exchanges and control the branching of the voice data into each of the two communication channels, the management station comprising a control interface, a first stand-alone processing module belonging to the first public communication channel, a second stand-alone processing module belonging to the second secure communication channel and a display interface.

The method is noteworthy in that it comprises:
a step of generating a control message from the control interface to the first stand-alone processing module following a physical control from an operator;
a step of emitting a primary message from the first stand-alone processing module, according to the control message received, to the second stand-alone processing module,
a step of generating a display by the second stand-alone processing module according to said primary message received; and
a step of displaying said display interface for the attention of said operator.

BRIEF DESCRIPTION OF THE DRAWINGS

The invention shall be better understood when reading the following description, provided solely by way of example, and in reference to the annexed drawings wherein.

Note that the figures disclose the invention in a detailed manner in order to implement the invention, said figures can of course be used to define the invention better where applicable.

DETAILED DESCRIPTION

Figure 1:
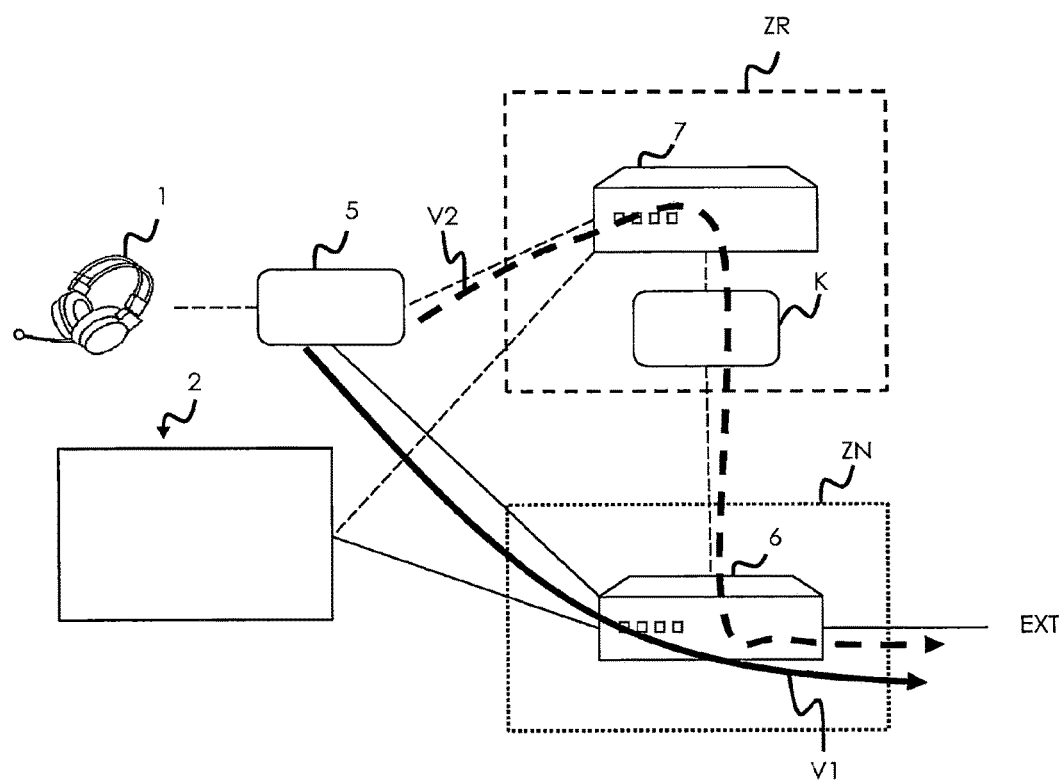
FIG. 1 is a diagrammatical representation of a communication system according to prior art.
Figure 2:
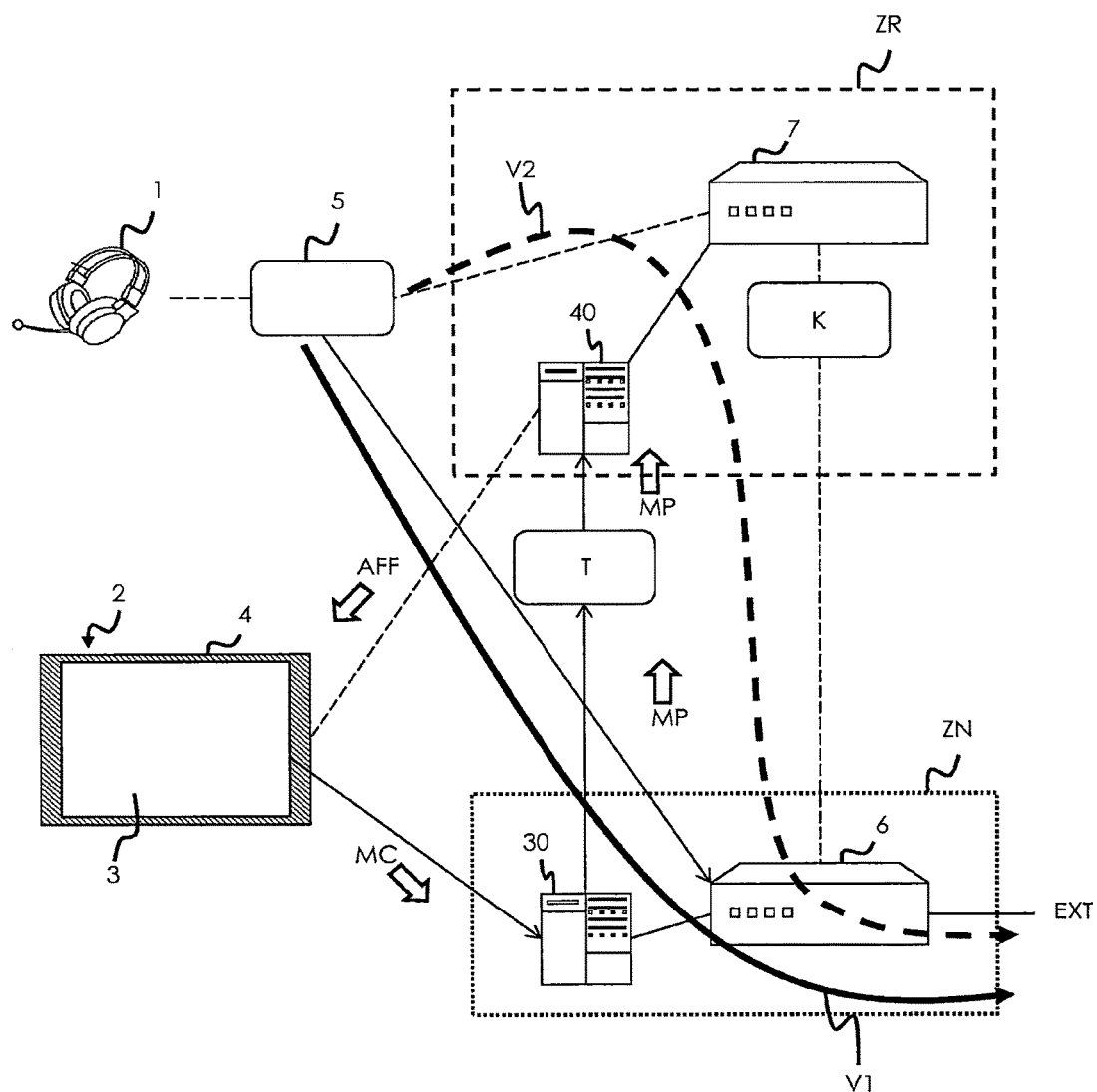
FIG. 2 is a diagrammatical representation of a communication system according to the invention.

A communication system for an air control centre according to the invention is shown in FIG. 2.

In reference to FIG. 2, the communication system comprises a first public communication channel V1, a second secure communication channel V2, a voice communication device 1 for exchanging voice data on each of the two communication channels V1, V2 and a management station 2, comprising a control interface 3 and a display interface 4, designed to manage the voice data exchanges and control the branching of the voice data into each of the two communication channels V1, V2.

According to the invention, as details shall be provided in what follows, the control interface 3 and the display interface 4 of the management station 2 are dissociated from each other in order to prevent control information and/or viewing information from transiting via the same electrical power supply as was the case of prior art with a management station having the form of a conventional tactile device wherein the control interface and the display interface are associated. In addition, as details shall be provided in what follows, such dissociation makes it possible to prevent intelligible information from being compromised in case of interception.

In this example, each operator of the air control centre is provided with a voice communication device 1 and with a management station 2. Each voice communication device 1 has the form of a micro-headset in order to be able to receive and emit voice data but it goes without saying that other types of voice communication devices may be suitable. Each management station 2 has exteriorly the form of a tactile device with an improved design such as shall be presented in what follows.

In what follows, the first public communication channel V1 is referred to as "black channel" while the second secure communication channel V2 is referred to as "red channel".

Contrary to the first public communication channel V1, the secure communication channel V2 comprises an encryption-decryption module K, known to those skilled in the art, in order to encrypt and decrypt the voice data emitted.

In reference to FIG. 2, the first public communication channel V1 comprises a first network switch 6 for exchanging voice data between a plurality of voice communication devices 1 and the exterior EXT, i.e., aircraft of a predetermined navigation zone or of other air control centres. The second secure communication channel V2 comprises a second network switch 7 and an encryption module K which are designed to exchange encrypted voice data between a plurality of voice communication devices 1 and the exterior EXT. In particular, the second network switch 7 of the second secure communication channel V2 is connected to the first network switch 6 of the first public communication channel V1 via the encryption module K in order to access the exterior EXT. Preferably, the network switches 6, 7 are audio switches.

As such, in reference to FIG. 2, in order to control a civil aircraft, the operator uses his micro-headset to emit voice data directly to the first network switch 6 of the first public communication channel V1 in order to access the exterior. On the contrary, in order to control a military aircraft, the operator uses his micro-headset to emit voice data directly to the second network switch 7 of the second secure communication channel V2 so that the voice data is encrypted by the encryption module K before it is transmitted to the first network switch 6 of the first public communication channel V1 in order to access the exterior.

In a manner similar to prior art, the communication system comprises a security module 5 that connects each voice communication device 1 of an operator, i.e. his micro-headset, to the switches 6, 7 of the first public communication channel V1 and of the second secure communication channel V2. Such a security module 5 makes it possible to ensure that the voice data emitted by the operator are is indeed emitted in an encrypted manner such as presented in patent application EP2943813.

In practice, the communication system comprises a plurality of communication devices of which a portion of the devices is located in a secure zone referred to as "red zone ZR". A black zone ZN is defined wherein the devices are housed which are not located in the secure zone. The voice data that circulates through the devices of the black zone ZN is not sensitive. On the contrary, the voice data that circulates through the device of the red zone ZR is sensitive and must not be compromised. In this example, in reference to FIG. 2, the communication system comprises a red zone ZR which is a room that is generally protected by a Faraday cage in order to prevent any undesired emission outside of said red zone ZR.

Still in reference to FIG. 2, the red zone ZR comprises the second network switch 7 of the second secure communication channel V2 as well as the encryption module K. The voice data emitted over the second secure communication channel V2 as such cannot be intercepted.

According to the invention, in reference to FIG. 2, the management station 2 comprises a control interface 3 and a display interface 4 which are dissociated in order to avoid connecting the first public communication channel V1 and the second secure communication channel V2 and as such limit the risk of interception of confidential data.

The control interface 3 of the management station 2 is designed to receive a physical control from an operator. In this example, the control interface 3 is a touchscreen that can be manipulated by the operator with one or several fingers so as to emit control messages MC, for example, via a connection of the USB type. As such, a press from an operator on the touchscreen corresponds to a control message MC that comprises, for example, the support geographical position, the support time, a support path, etc.

The display interface 4 of the management station 2 is designed to allow for the visualisation of a display AFF by the operator. In this example, the display interface 4 is a display screen of the LED or LCD type in order to receive displays via a connection, for example of the VGA, DVI or HDMI type.

In reference to FIG. 2, the management station 2 comprises a first stand-alone processing module 30, belonging to the first public communication channel V1, which is connected to the control interface 3 and which is configured to receive a control message MC from the control interface 3 and emit a primary message MP. The term stand-alone processing module means a calculation module that has its own electrical power supply.

The management station 2 also comprises a second stand-alone processing module 40, belonging to the second secure communication channel V2, which is configured for generating a display AFF on the display interface 4 following a reception of a primary message MP. Furthermore, the management station 2 comprises means for the unidirectional transfer T of a primary message MP from the first stand-alone processing module 30 to the second stand-alone processing module 40. In this example, the means for unidirectional transfer T comprise a unidirectional diode so as to authorise a transfer only from the first public communication channel V1 to the second secure communication channel V2. It goes without saying that the means for unidirectional transfer T can be of a different form.

Thanks to invention, only the primary messages MP are emitted over the first public communication channel V1, as the latter are not sensitive as they correspond only to data without a link with the controlled function.

Advantageously, the display AFF generated by the second stand-alone processing module 40 cannot be intercepted given that the latter belongs to the second secure communication channel V2. Furthermore, in this example, the second stand-alone processing module 40 belongs to the red zone ZR and is housed in a secure room, preferably, protected by a Faraday cage, which limits any risk of interception.

Furthermore, given that each interface 3, 4 is connected to a stand-alone processing module 30, 40, the power supplies are not shared and there is no risk of a display AFF transiting via the power supply of the first stand-alone processing module 30 of the first public communication channel V1. Finally, thanks to the means for unidirectional transfer T, no information can be transferred from the second secure communication channel V2 to the first public communication channel V1.

Advantageously, the dissociation of the interfaces 3, 4 of the management station 2 does not affect the execution of the tasks of the operators. Indeed, the control interface 3 and the display interface 4 are superimposed in the manner of a tactile screen according to prior art. From a practical standpoint, any press on the control interface 3 generates a display AFF on the display interface 4 which confirms that the operator has exerted a press. The experience of the operator is as such not degraded following the improvement in security.

Figure 3:
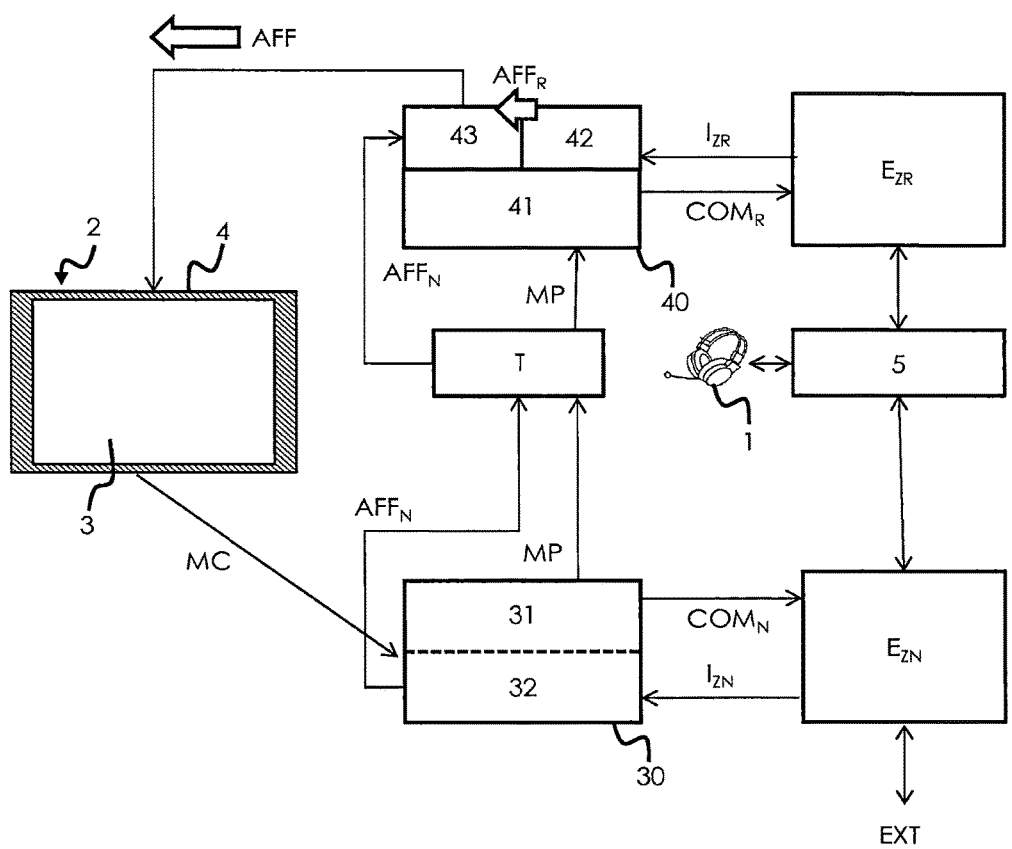
FIG. 3 is a diagrammatical representation of another embodiment of the communication system according to the invention.

A preferred embodiment of the invention shall now be presented in reference to FIG. 3. The references used to describe elements of structure or of a function identical, equivalent or similar to those of the elements of FIG. 2 are the same, in order to simplify the description. Moreover, all of the description of the embodiment of FIG. 2 is not included, as this description applies to the elements of FIG. 3 when there are no incompatibilities. Only the notable, structural and functional differences are described.

In reference to FIG. 3, the first stand-alone processing module 30 comprises means for processing 31 designed to convert the control message MC into a primary message MP that can be interpreted by the second stand-alone processing module 40. The primary message MP is an interpretation of the control message MC according to the knowledge according to the knowledge by the first stand-alone processing module 30 of the display AFF of the display interface 4.

Moreover, the means for processing 31 are also designed to emit a functional control $COM_N$ according to the control message MC received, for example, a change in frequencies to the devices of the black zone $E_{ZN}$, for example, the network switch 6.

The first stand-alone processing module 30 also comprises also means for generating a display 32 designed to generate a display public $AFF_N$ according to the control message MC received and the public information $I_{ZN}$ sent by the devices of the black zone $E_{ZN}$.

Still in reference to FIG. 3, in a manner similar to the first stand-alone processing module 30, the second stand-alone processing module 40 comprises means for processing 41 designed to emit a secure control $COM_R$ according to the primary message MC received, for example, an encryption of data to the devices of the red zone $E_{ZR}$, for example, the network switch 7 or the encryption module K.

Preferably, the second stand-alone processing module 40 comprises means for generating 42 designed to generate a secure display $AFF_R$ according to the primary message MP received and secure information $I_{ZR}$ sent by the devices of the red zone $E_{ZR}$.

Still in reference to FIG. 3, the second stand-alone processing module 40 comprises means of synthesis 43 designed to combine the public display $AFF_N$ and the secure display $AFF_R$ and to generate the global display AFF intended to be displayed on the display interface 4 of the management station 2. The use of generation modules 32, 42 advantageously makes it possible to dissociate the public displays from the confidential displays and as such share the generation of displays between the two stand-alone processing modules 30, 40.

An example of an implementation of the invention shall now be presented for the air control of a military aircraft.

In reference to FIG. 3, an operator of an air control centre is provided with a micro-headset and with a tactile device with an improved design in order to control a military aircraft located in an air navigation zone.

By way of example, the operator desires to change the communication frequency and to encrypt the communication with said military aircraft. To this effect, the operator presses the touchscreen in the zone displaying the icon relative to a change in frequency with encryption on the display screen, with the touchscreen and the display screen being superimposed.

This physical pressing of the operator is translated into a control message MC which is emitted by the touchscreen 3 to the first stand-alone processing module 30. The control message MC comprises, in this example, the support geographical position.

The means for processing 31 of the first stand-alone processing module 30 convert the control message MC into a primary message MP which is sent to the means for transferring T. Preferably, the primary message MP is an encapsulation of the control message MC.

In this example, the means for processing 31 of the first stand-alone processing module 30 furthermore emit a functional control $COM_N$ to the devices of the black zone $E_{ZN}$, in particular to the network switch 6, in order to control a change in frequencies.

In parallel, the means for generating a display 32 of the first stand-alone processing module 30 generate a public display $AFF_N$, wherein the frequency change icon is, for example, of a different colour, which is transmitted to the second stand-alone processing module 40 via the means for transferring T. Preferably, the public display $AFF_N$ can also include public information $I_{ZN}$ coming from the devices of the black zone $E_{ZN}$, in particular, the acknowledgement by the device $E_{ZN}$ of the command for changing the frequency and the information that it has carried out this change successfully.

The means for unidirectional transfer T advantageously make it possible to link the two stand-alone processing modules 30, 40 together without risk of compromising secure data.

Still in reference to FIG. 3, the primary message MP is received by the means for processing 41 of the second processing module 40 that emit a secure functional control $COM_R$ to the devices of the red zone $E_{ZR}$, in particular to the network switch 7, in order to control an encrypting of the communications by the encryption module K.

In parallel, the means for generating a display 42 of the second processing module 40 generate a secure display $AFF_R$, wherein the encryption icon is, for example, of a different colour. Preferably, the private display $AFF_R$ can also comprise secure information $I_{ZR}$ coming from the devices of the red zone $E_{ZR}$, in particular, the acknowledgement by the device $E_{ZR}$ of the command for switching to encryption and the information that it has carried out this switch successfully.

Advantageously, the private display $AFF_R$ transits only in the devices of the red zone ZR which is secure, which limits the risk of compromise.

Finally, the means of synthesis 43 of the second processing module 40 form a global display AFF using the secure display $AFF_R$ and the public display $AFF_N$. Advantageously, the global display AFF comprises, in our example, a frequency change icon and an encryption icon of different colours. The global display AFF is then displayed on the display interface 4 (screen) of the tactile device 2. As such, the operator is informed that his pressing on the control interface 3 (touchscreen 3) has been taken into account and that the change in frequencies and the encryption are activated.

A generation of displays by the two stand-alone processing modules 30, 40 allow for a monitoring in real-time of the global display AFF during the switching between the two communication channels V1, V2 given that the two stand-alone processing modules 30, 40 change in parallel as the messages are received.

Preferably, the connections between the stand-alone processing modules 30, 40 and their respective interfaces 3, 4 are made of optical fibre in order to improve security. Preferably, the means of interface are used to connect the processing modules 30, 40 and the interfaces 3, 4 to the optical fibres, more preferably, interfaces of the KVM type. The optical fibre makes it possible, on the one hand, to uncouple the power supplies of the processing modules 30, 40 and, on the other hand, to prevent a compromise via radiation and via conduction on the cables that transport the signals.

Preferably, the connections between the stand-alone processing modules 30, 40 and the means for unidirectional transfer T, in particular a diode, are also made from optical fibre in order to improve the decoupling between the two zones ZN, ZR.

An implementation during the emission of data has been presented but it goes without saying that the system can prevent, symmetrically, a compromising the data received.

Likewise, an implementation has been presented wherein the stand-alone processing modules 30, 40 are located in different zones. However, it goes without saying that the stand-alone processing modules 30, 40 can be situated in the same zone.

Advantageously, offsetting the stand-alone processing modules 30, 40 makes it possible, in addition to reducing the risk of electromagnetic compromise, to lighten the management station 2 and as such to limit its encumbrance.

Thanks to invention, the risk of compromise by the management station 2 is considerably limited. Advantageously, this improvement in security is transparent for the operators of the air control centre.

The invention claimed is:

1. A communication system for an air control centre comprising:
   a first public communication channel,
   a second secure communication channel,
   at least one voice communication device for exchanging voice data on each of the two communication channels,
   at least one management station, comprising a control interface and a display interface, designed to manage the voice data exchanges and control the branching of the voice data into each of the two communication channels,
   system characterised by the fact that the management station comprises:
   a first stand-alone processing module, belonging to the first public communication channel, designed to (1) receive a control message from the control interface following a physical control from an operator and (2) emit a primary message according to the control message received;
   a second stand-alone processing module, belonging to the second secure communication channel, that is designed to (1) receive the primary message from said first stand-alone processing module and (2) generate a display according to the primary message received on the display interface for the attention of the operator; and
   means for transferring the primary message from the first stand-alone processing module to the second stand-alone processing module.

2. The communication system according to claim 1, wherein the control interface is a touchscreen.

3. The communication system according to claim 1, wherein the control interface and the display interface are superimposed.

4. The communication system according to claim 1, wherein the means for transferring are unidirectional.

5. The communication system according to claim 4, wherein the means for transferring comprise at least one diode.

6. The communication system according to claim 1, wherein the second stand-alone processing module is located in a secure zone.

7. The communication system according to claim 1, wherein the control interface is connected to the first stand-alone processing module by an optical fibre.

8. The communication system according to claim 1, wherein, the first stand-alone processing module comprises means for processing designed to emit a functional control, according to the control message received, to a device of the first public communication channel.

9. The communication system according to claim 1, wherein, the first stand-alone processing module and the second stand-alone processing module comprise respectively means for generating a public display and a secure display, the second stand-alone processing module comprises a means of synthesis to form a display combining the public display and the secure display.

10. The communication system according to claim 6, wherein the secure zone comprises a room protected by a Faraday cage.

11. The communication system according to claim 1, wherein the first stand-alone processing module emits the primary message via the first public network switch to the second stand-alone processing module.

12. The communication system according to claim 1, wherein the second stand-alone processing module transmits the generated display via the second secure network switch to the display device.

13. The communication system according to claim 1, wherein the first stand-along processing module has a first power supply and the second stand-alone processing module has a second power supply different from the first power supply.

14. A method of communication for an air control centre comprising:
   generating a control message from a control interface of a management interface to a first stand-alone processing module belonging to a first public network switch that exchanges voice data with a voice communication device, following a physical control from an operator;
   emitting a primary message from the first stand-alone processing module, according to the control message received, to a second stand-alone processing module belonging to a second secure network switch that exchanges voice data with the voice communication device and a display device,
   generating a display by the second stand-alone processing module according to the primary message received; and
   displaying the display on the display interface for the attention of an operator.

15. The method of claim 14, wherein the step of emitting the primary message from the first stand-alone processing module comprises emitting the primary message via the first public network switch.

16. The method of claim 14, wherein the step of generating the display comprises transmitting the primary message to the display via the second secure network switch.

17. The method of claim 14, further comprising transmitting the control message to the first stand-along processing module via the first public network switch.

18. The method of claim 14, wherein a management station comprises the display interface and the control interface.

19. The method of claim 14, further comprising superimposing the control interface and the display interface.

20. The method of claim 14, further comprising disposing the second stand-alone processing module within a secure zone comprising a Faraday cage.

* * * * *